United States Patent [19]

O'Sullivan et al.

[11] Patent Number: 4,980,786

[45] Date of Patent: Dec. 25, 1990

[54] METHOD AND APPARATUS FOR IMPROVED THERMAL ISOLATION AND STABILITY OF DISK DRIVES

[75] Inventors: William O'Sullivan, Milpitas, Calif.; Robert Freeman, Erie, Colo.; Harold T. Wright, San Carlos, Calif.

[73] Assignee: Maxtor Corporation, San Jose, Calif.

[21] Appl. No.: 270,717

[22] Filed: Nov. 14, 1988

[51] Int. Cl.$^5$ .............................................. G11B 33/14
[52] U.S. Cl. ................................................. 360/97.03
[58] Field of Search ........................... 360/97.02–97.04

[56] References Cited

U.S. PATENT DOCUMENTS

| | | | |
|---|---|---|---|
| 3,577,133 | 5/1971 | Garfein et al. | 360/97.02 |
| 4,367,503 | 1/1983 | Treseder | 360/97.03 |
| 4,553,183 | 11/1985 | Brown et al. | 360/97.02 |
| 4,620,248 | 10/1986 | Gitzendanner | 360/97.02 |
| 4,796,121 | 1/1989 | Adamek et al. | 360/97.02 |
| 4,831,476 | 5/1989 | Pisczak | 360/97.02 |

OTHER PUBLICATIONS

IBM/TDB, vol. 27, No. 11, Apr. 1985, p. 6588, "Seal for a Hermetically Sealed Disk File".

Primary Examiner—John H. Wolff
Attorney, Agent, or Firm—Hecker & Harriman

[57] ABSTRACT

A thermally independent dedicated servo disk drive where the temperature is kept within an acceptable range and temperature gradients that can cause differential thermal expansion are eliminated to minimize off tracking due to differential thermal expansion of thermally sensitive components. A novel isolated "box within a box" architecture is utilized to provide a thermal buffer to external temperature gradients and an inner HDA support structure is coupled to an outer housing with thermally insulative isolators which prevent the conductive transfer of heat from external sources where the outer housing and isolators create a thermal buffer to shield the inner HDA support structure from external heat sources. In addition, certain heat generating components not integrated into the symmetrical thermal "box within a box" design are isolated where possible. Thus, a thermally symmetrical environment is provided in the area of thermally sensitive components that could otherwise degrade tracking during temperature transients.

8 Claims, 6 Drawing Sheets

Fig. 2
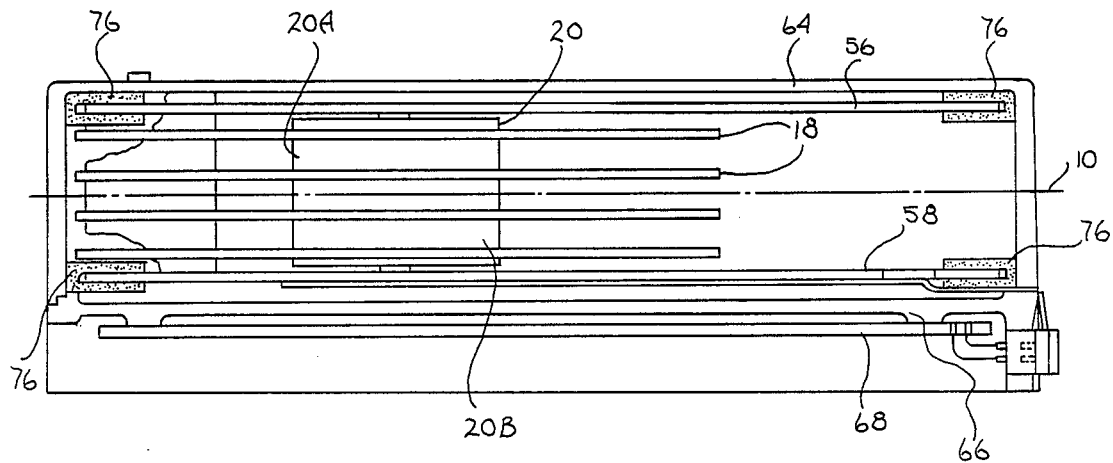
Fig. 3
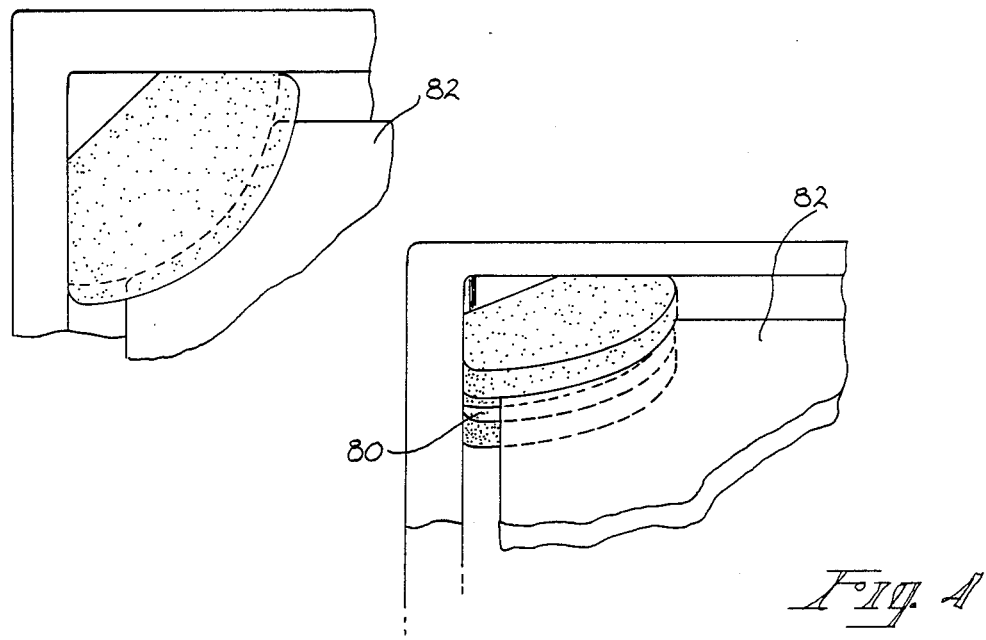
Fig. 4

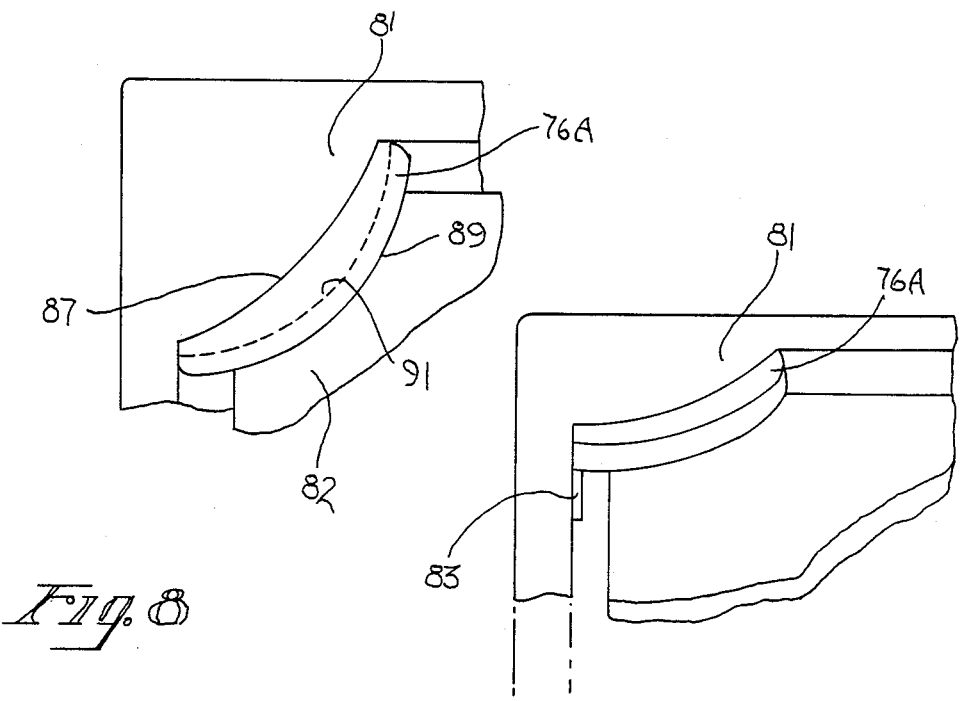

METHOD AND APPARATUS FOR IMPROVED THERMAL ISOLATION AND STABILITY OF DISK DRIVES

BACKGROUND OF THE PRESENT INVENTION

1. Field of the Present Invention

The present invention relates to the field of disk drive storage systems.

2. Background Art

The performance of a disk drive storage system is dependant on the interaction of a number of dynamic and static components and on the precision with which mechanical tolerances between these components can be maintained and controlled. Correspondingly, the effects of differential thermal expansion must be carefully considered and controlled in the design and operation of a disk drive storage system to prevent failures and losses in performance, particularly due to tracking misregistration.

In the prior art, a dedicated servo system is one method employed to provide positioning information to the disk drive system. A servo head having a fixed relationship to one or more data heads is positioned over a servo track, e.g. servo track n, on the dedicated servo surface, defining a data track, e.g. track n'. For typical track dimensions of prior art disk drive storage systems, which are on the order of approximately 1000 tracks per inch (tpi), the dedicated servo approach provides adequate position information. Thermal expansion effects are minimized because the track pitch is within tolerable limits of differential position. That is, if the differential position of the data disk and servo disk is $\pm x$, but the track width approximates 5-10x, the data head will still be positioned over servo track n' when the servo head is positioned over track n. However, if the differential position of the data disk with respect to the servo disk, caused by thermal expansion differences of the disks, shafts and other components, exceeds the acceptable limit, the data head could be positioned over track $n'+1$ when the servo head is positioned over servo track n, leading to read/write errors.

Thus, track density for dedicated servo drives is limited by the differential position of the data disk to the servo disk. This position differential between the data and servo disks is caused by differential thermal expansion between shafts, motors, windings and other associated components due to unequal heat distribution in the head/disk assembly (HDA).

One prior art attempt to achieve higher track density is to use a "wedge" or "sector" servo scheme in which bursts of servo information are interleaved with the data tracks themselves. This attenuates the relative effects of thermal expansion because absolute track position information is provided for each track, as opposed to the relative position information of a dedicated servo system. However, sector servo schemes lack the performance and speed of dedicated servo schemes. After a seek, each head in a cylinder of a sector servo drive must be polled and must wait for a servo sector to pass below to determine position information, adding to seek time and lowering performance.

Thus, it is an object of the present invention to provide a dedicated servo disk drive which permits high track density while attenuating the effects of thermal expansion variations.

It is another object of the present invention to provide a dedicated servo disk drive in which thermally sensitive components are isolated from thermal variation from external sources.

It is yet another object of the present invention to provide a dedicated servo disk drive in which certain internal heat generating components are isolated from thermally sensitive components.

It is still another object of the present invention to provide a dedicated servo disk drive in which thermally sensitive components are disposed in a thermally symmetrical manner to reduce or stabilize differential thermal expansion effects.

Other objects and attendant advantages of the method and apparatus of the present invention will be apparent from the drawings and description of the present invention.

SUMMARY OF THE PRESENT INVENTION

The present invention is directed to a dedicated servo disk drive providing high track density which is substantially thermally independent. The present invention relies on a dual approach to minimize off tracking due to differential thermal expansion of thermally sensitive components such as servo disks, data disks, shafts and supports. The present invention seeks to keep the temperature within an acceptable range and to eliminate temperature gradients that can cause differential thermal expansion. The first step utilizes thermal isolation of the temperature sensitive components from external temperature variations. The preferred embodiment of the present invention utilizes a novel isolated "box within a box" architecture to provide a thermal buffer to these external temperature gradients. An inner HDA support structure containing the disks, drive shaft, actuator arm and actuator motor is coupled to an outer housing with thermally insulative isolators which prevent the conductive transfer of heat from external sources. The external structure and isolators create a thermal buffer to shield the inner HDA support structure from external heat sources.

The present invention also isolates certain heat generating components not integrated into the symmetrical thermal design of the box within a box from the sensitive components where possible. For example, the control board, a printed circuit board containing a number of heat sources, is disposed within the base of the housing to reduce its effects on the HDA.

The present invention also provides a thermally symmetrical environment in the area of thermally sensitive components that could otherwise degrade tracking during temperature transients. The present invention accomplishes this by using components with closely matched thermal expansion coefficients and by creating a symmetrical profile with respect to the horizontal center plane of the HDA of both sensitive components and heat transfer. Even if components have the same coefficients of thermal expansion, if temperature gradients exist in the environment, unequal expansion and/or contraction can result, leading to performance failures. Thus, the present invention employs an architecture which is substantially symmetrical about a physical plane horizontally bisecting the HDA.

BRIEF DESCRIPTION OF THE DRAWINGS

FIG. 2 is a side view of the disk/shaft housing assembly of the present invention.

FIG. 3 is an expanded top view of a thermal isolator of the present invention.

FIG. 4 is a perspective view of the thermal isolator of FIG. 3.

FIG. 8 is a top view of an alternate embodiment of an isolator of the present invention.

FIG. 9 is a perspective view of the isolator of FIG. 8.

DETAILED DESCRIPTION OF THE PRESENT INVENTION

A disk drive which reduces the effect of differential thermal expansion to reduce or eliminate off tracking is described. In the following description, numerous specific details, such as number of disks, track pitch, etc., are set forth to provide a more thorough description of the present invention. It will be apparent, however, to one skilled in the art, that the present invention may be practiced without these specific details. In other instances, well known features have not been described in detail so as not to obscure the present invention.

Figure 1:
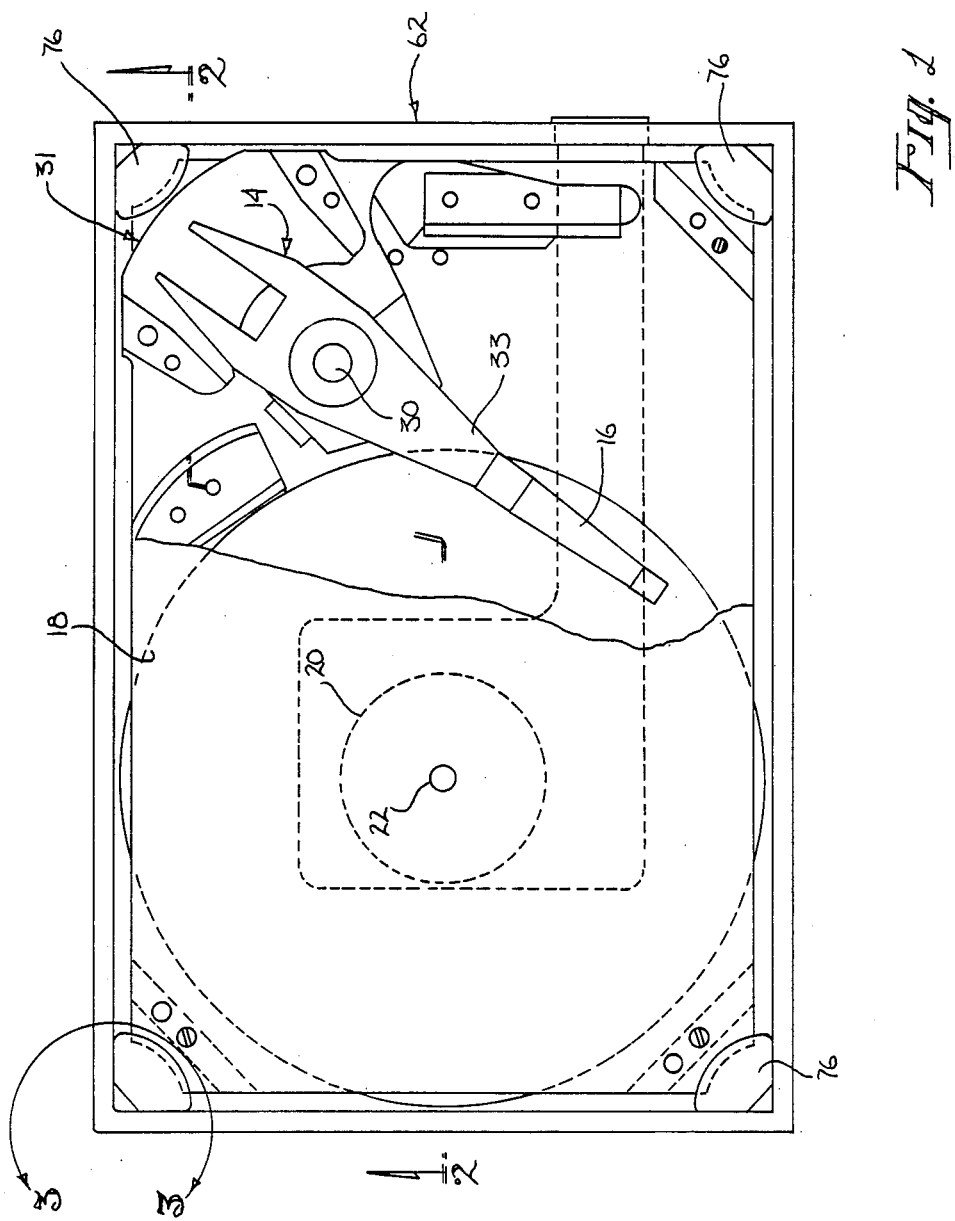
FIG. 1 is a top view of the disk drive assembly of the present invention.

Referring generally to FIGS. 1 and 2, a top view and a side view respectively, of a disk drive assembly is shown, including magnetic disks 18 and an actuator arm assembly 14. In the preferred embodiment of the present invention a plurality of rigid disks 18 are arranged in a stack on a spindle 20. The disks are fixed to a spindle 20, which rotates about shaft 22. The spindle motor 11, (see FIG. 7), is integral with the spindle assembly in the present preferred embodiment. The disks 18 are mounted on spindle 20 so that they are parallel to each other and arranged in a vertical stack. In the preferred embodiment, the disks are approximately 3½ inches in diameter, and are made of aluminum coated with a magnetic coating, wherein both the upper and lower sides of the disks are used for data storage arranged in concentric data 'tracks' thereon.

The actuator arm assembly 14, (see FIG. 6), includes a plurality of arm elements 16 pivotally mounted to a shaft 30. A voice coil motor assembly 31 is mounted opposite the arm set 33, which enables the arm set to pivot about the shaft 30, as is well known in the art. The voice coil motor includes a centerpole 32, a coil 34 that surrounds the centerpole, and upper and lower magnet frames 36 and 38 respectively.

Opposite the voice coil motor from the shaft and attached to the terminus of the arm elements are flexures 48. Each flexure includes a magnetic head 50 mounted thereto, and mounting pad 54. The flexures are affixed to the arm elements using a ball suage which creates an interference fit when a ball is press-engaged in boss 44 to secure the flexure to the arm element via the mounting plate 54.

Referring again to FIGS. 1 and 2, the thermally isolated HDA support structure of the present invention is illustrated. The HDA is substantially contained within a housing 62 consisting of cover 64 and base 66. This housing 62 protects the HDA from thermal shock introduced by the outside environment. The cover 64 dissipates heat throughout its entire surface area to reduce the gradient effects of a thermal shock. The housing 62 also provides a sealed environment for the HDA and in the present invention, is filled with dry nitrogen to reduce moisture and oxygen in the interior of the housing 62.

The HDA itself is mounted within the housing 62 by means of an HDA support structure so as to create a "box within a box" architecture to further protect the HDA from thermal variations. The HDA support structure consists of upper and lower mounting plates 56 and 58 respectively. The HDA is mounted directly between the upper plate 56 and lower plate 58. The motor and actuator arm shaft assemblies are rigidly secured between the plates by means of a press fit into the plates which are located through standoffs 60 and the voice coil magnet frame. These plates are coupled to the outer housing 62 through means of thermal isolators 76 disposed substantially at the interior corners of the outer housing 62. These thermal isolators prevent the transfer of heat to the HDA. In the preferred embodiment of the present invention, the isolators are comprised of rubber. However, any suitable thermally nonconductive material may be used without departing from the scope of the present invention.

Figure 5:
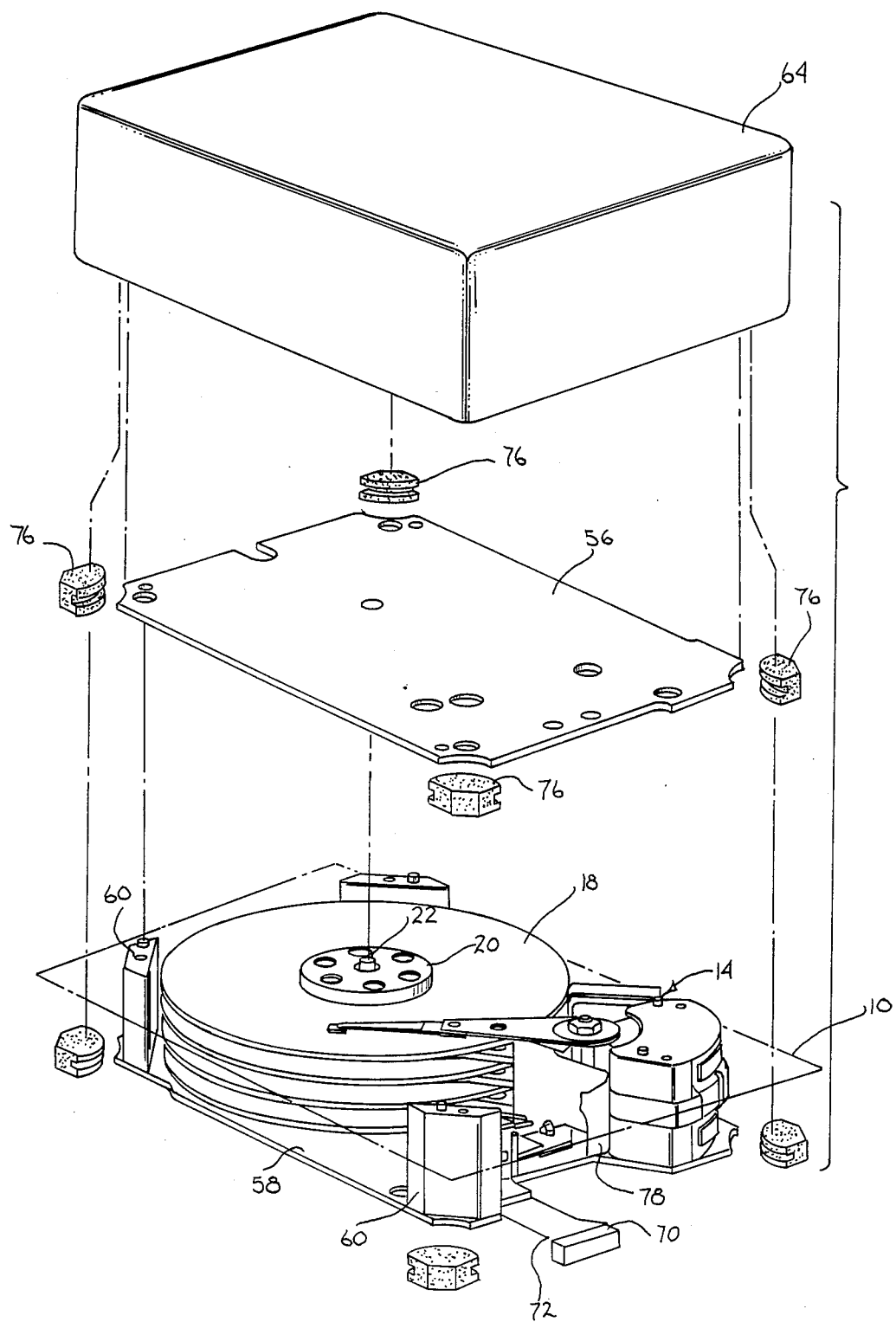
FIG. 5 is a perspective view of the disk drive housing assembly of the present invention.

Referring now to FIG. 5, a perspective view of the drive housing, and its relationship to the internal, isolated HDA is shown. The HDA components are mounted on and between upper and lower plates 56 and 58 respectively. The entire HDA/upper and lower plate assembly is disposed within the outer drive housing. The drive housing consists of a cover 64 and base 66. The cover 64 is substantially an inverted box which fits over the HDA and plates. Standoffs 60 mounted to the corners of and between the upper and lower plates 56 and 58, define the vertical dimension of the HDA/plate assembly. Therefore, the vertical dimensions of the cover 64 are slightly greater than the HDA/plate assembly so that the cover can receive the entire assembly.

Still referring to FIG. 5 and also to FIGS. 3 and 4, the mounting of the isolators 76 is shown. In the present preferred embodiment, the isolators are wedges of a resilient and insulative material, such as rubber. The isolators have a slot 80 for receiving the corner regions 82 of the plates. The corners of the plates have arcuate corner portions for receivably engaging these slots of the isolators. The isolators provide thermal, as well as shock and vibration isolation of the HDA from the outside environment. The isolators are maintained in slight compression between the housing and the plates. Thus, the HDA, mounted to plates 56 and 58, fits securely within the enclosure formed by the cover 64 and the base 66, supported firmly within the housing against the corner regions of the cover 64 and base 66.

Referring to FIGS. 8 and 9, an alternate embodiment of the isolators of the present invention is illustrated. In this embodiment, the interior corner of the cover 64 includes a boss 81 to provide a mounting point for screws or other fastening devices to couple the base 66 to cover 64. Accordingly, the isolator 76A comprises an arcuate shape abuting the boss 81 such that the isolator 76A has an interior and exterior radius 87 and 89 respectively. In addition, the isolator 76A of this embodiment is substantially "L" shaped in cross section as shown by extending member 83 which extends along edge 91 of corner 82. The isolator 76A still provides a press fit between the cover 64 and the plates 56 and 58.

Referring again to FIG. 2, the printed circuit board 68 containing the operative electronic components for the drive is mounted below the base. To prevent the heat generating components of the printed circuit board from creating temperature gradients in the HDA, the printed circuit board 68 is mounted beneath base 66. Thus, base 66 acts as a barrier to thermal shocks from printed circuit board 68. Further, any temperature gradients generated by the printed circuit board 68 will be evenly dissipated by the base 66 and cover 64, resulting in a more uniform temperature profile in the HDA. A connector 70 provides for electrical connection to the spindle motor of the HDA via flexible circuit 72. A second flexible circuit 78 provides electrical connection to the actuator assembly.

The present invention drive design provides a thermal circuit for the HDA that is substantially symmetrical above and below the centerplane 10 that bisects the HDA. To accomplish this, the main drive components typically subject to temperature transients that can result in off-tracking, namely the HDA, are specifically designed to be thermally balanced about the bisecting centerplane such that heat introduced in those components is transferred with a balanced profile that is substantially matched above and below the centerplane 10.

Figure 6:
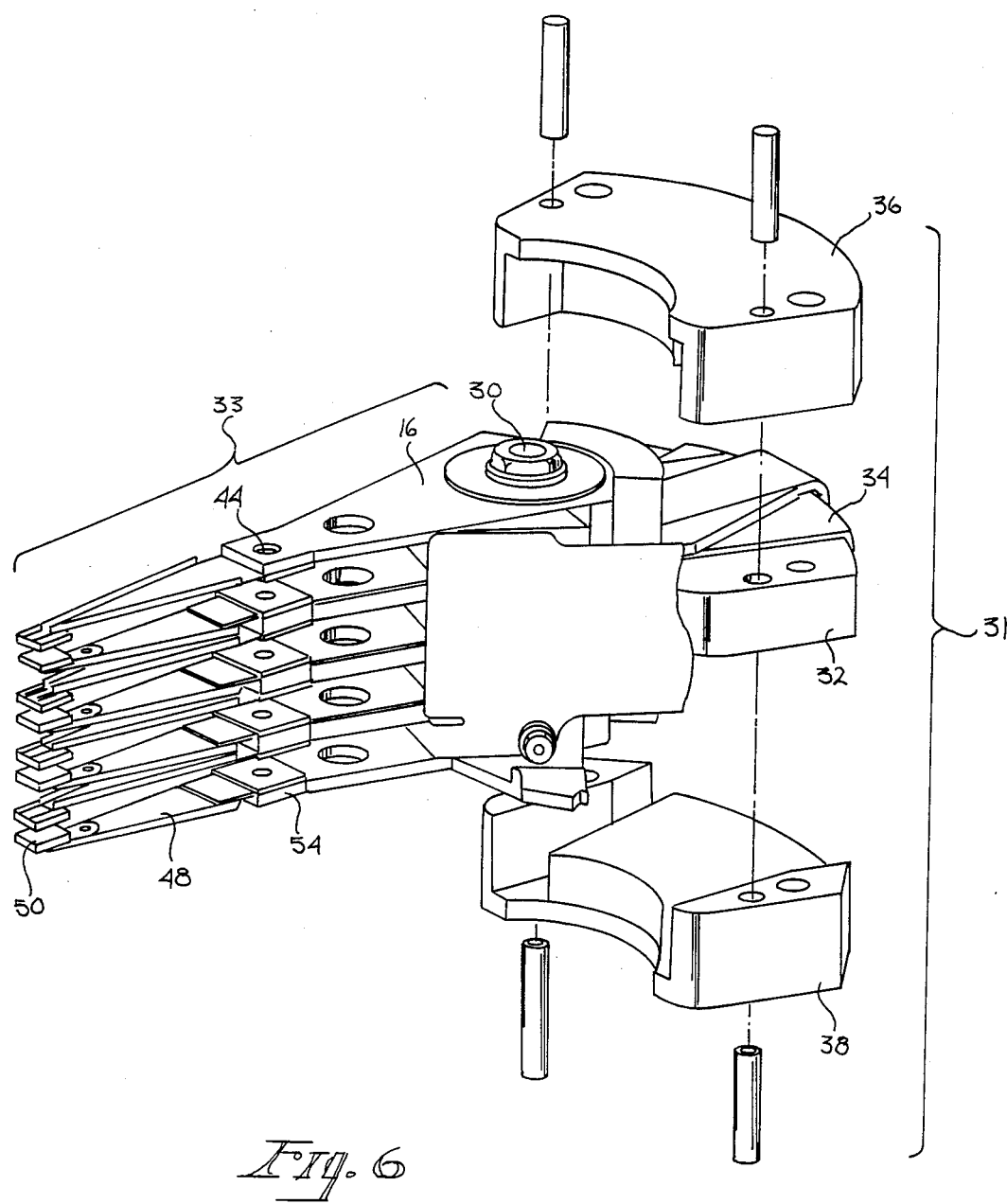
FIG. 6 is a perspective view of the actuator motor assembly of the present invention.

The actuator motor is made of components that substantially mirror each other above and below the centerplane 10. Thus as seen in FIG. 6, the actuator motor includes two opposing, matched magnet frames 36 and 38 having substantially the same dimensions and made of same materials. Similarly, the centerpole and coil have the same cross section above and below the centerplane 10. Likewise, the arm set 33 is uniform in cross section above and below the centerplane, as are the flexures 48. Likewise, the shaft is symmetrical about the centerplane 10.

Figure 7:
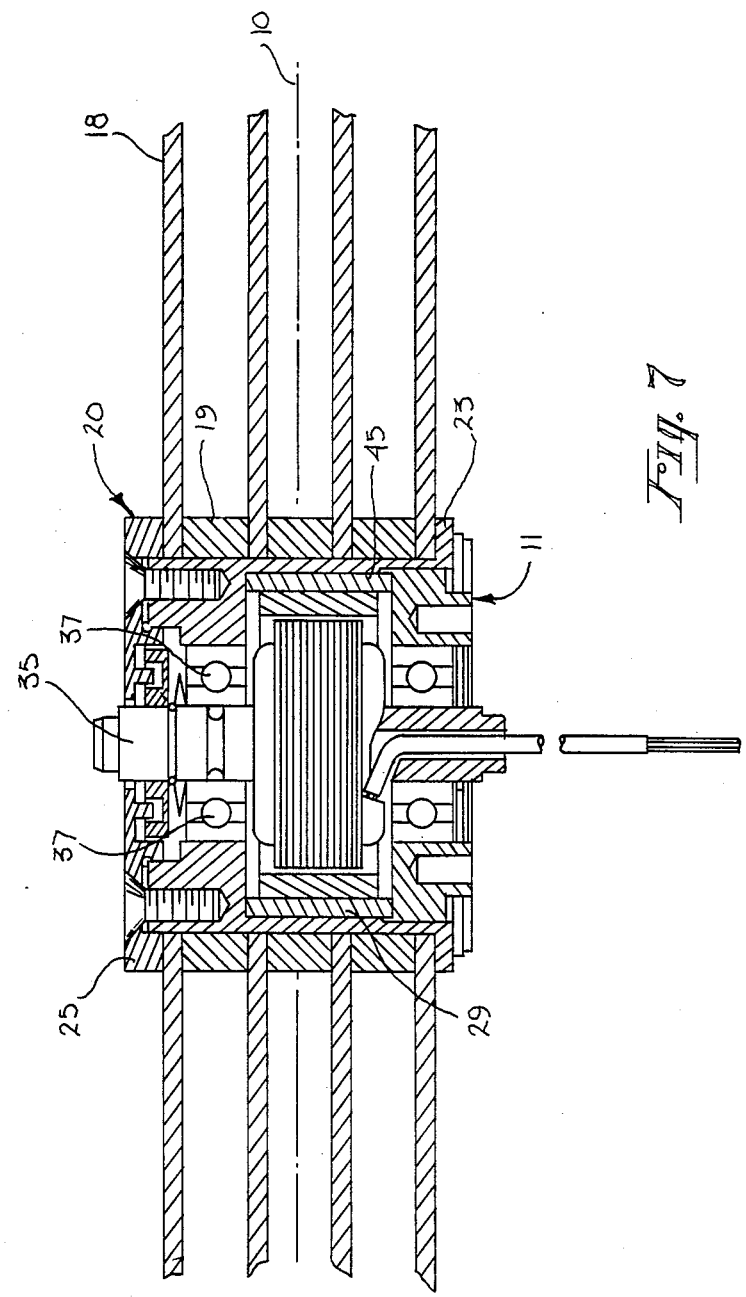
FIG. 7 is a side view of the spindle motor assembly of the present invention.

Referring now to the spindle assembly of FIG. 7, the disks 18 mounted thereon are spaced equally apart and matched in their position and number above and below the transverse centerplane 10 of the HDA. The other components of the spindle assembly that provide the primary thermally conductive paths for the transfer of heat away from the spindle motor are substantially matched in dimension, material and location above and below the centerplane of the HDA to provide symmetrical and uniform heat transfer above and below the centerplane. Thus, the disk drive in the present configuration maintains a substantially uniform temperature profile and thermal inertia above and below the centerplane 10.

Referring again to FIG. 5, the motor shaft and actuator arm assembly shaft are both symmetrical about the centerplane. Further, the shafts and plates are constructed of materials having the same coefficient of thermal expansion. In the preferred embodiment of the present invention, these components are comprised of steel. However, other thermally matched components may be utilized as well without departing from the scope of the present invention.

Power is dissipated in the spindle motor via the windings of the stator, and in the actuator, via the voice coil. This power dissipation can generate temperature gradients which can affect drive performance and lead to off tracking errors. Therefore, both the motor windings and voice coil windings are disposed symmetrically about both sides of the centerplane such that heat is dissipated uniformly through the shafts and associated components above and below the centerplane.

The motor of the preferred embodiment of the present invention is an aluminum in-spindle motor assembly as described in U.S. Pat. No. 4,814,652 issued Mar. 21, 1989 entitled IN-SPINDLE MOTOR ASSEMBLY FOR DISK DRIVE AND METHOD FOR FABRICATING SAME and assigned to the assignee of the present invention. In the present case, the motor is symmetrical with regards to its substantially thermally conductive components about the center plane. The motor is illustrated in FIG. 7. A disk stack consisting of disks 18 and spacers 19, both preferably comprised of aluminum, are mounted on spindle 20 such that the bottom most disk rests on flange 23. Spindle 20 is comprised of spindle hub 25 and bearing sleeve 27, also comprised of aluminum in the preferred embodiment. By making the motor out of thermally matched parts, such as aluminum, thermal distortions and misalignments are substantially eliminated. The motor of the present invention also includes a ferro magnetic flux sleeve 29, comprised of low carbon steel for example, to provide a flux path for the motor magnets 45. The motor assembly is coupled to the stator shaft 35 through bearings 37.

During drive operation, heat is generated from the spindle motor, the rotation of the disks, from the printed circuit board 68, and from the actuator motor. That heat is transferred in accordance with the present invention uniformly and at the same rate above and below the HDA centerplane 10. In operation, the external housing, when subject to thermal shock, will dissipate the heat throughout the housing. If the internal environment of the drive undergoes some temperature increase, the heat therein will be distributed uniformly among the thermally matched HDA components. Further, the isolators 76 will isolate the HDA from thermal shock. The heat generated by the internal components is ultimately transmitted through the spindle shaft 20 above and below the centerplane to the plates in a uniform manner, and to the other thermally matched components above and below the centerplane.

Because the thermal profile of the HDA is uniform, spacing differentials between the servo disk and the data caused by thermal expansion are kept within very close tolerances, on the order of approximately ±50 microinches. Therefore, high track densities can be achieved while still utilizing a dedicated servo configuration. In the preferred embodiment of the present invention, a track density of approximately 1600-200 tpi is achieved.

Thus, a disk drive which is substantially independent of thermal variations is described.

We claim:

1. A disk drive assembly system comprising:
   a housing having a cover coupled to a base;
   a head disk assembly including a plurality of disks mounted on a spindle motor assembly, an actuator arm assembly pivotally mounted adjacent said disks, a plurality of read/write heads mounted on said actuator arm assembly, and an actuator motor coupled to said actuator arm assembly;
   a support structure which supports said head disk assembly including a top plate and a bottom plate coupled to said head disk assembly for positioning and retaining said head disk assembly, said top plate and bottom plate including a plurality of isolators coupled to said top plate and bottom plate;
   said support structure disposed within said housing such that said isolators abut said cover and are disposed between said cover and said top and bottom plates respectively.

2. The system of claim 1 wherein said isolators comprise a thermally nonconductive, resilient material.

3. The system of claim 2 wherein said isolators comprise rubber.

4. The system of claim 1 further including a circuit board including electronic circuitry for controlling said system disposed beneath and coupled to said base such that thermal gradients generated by said board are dissipated by said base.

5. The system of claim 1 wherein said head disk assembly is disposed such that it is symmetrical about an imaginary center plane perpendicular to and bisecting said spindle motor assembly.

6. The system of claim 1 wherein the interior of said housing is filled with nitrogen to reduce moisture and oxygen and said housing is sealed.

7. The system of claim 1 wherein said system comprises a dedicated servo system.

8. The system of claim 1 wherein said spindle motor assembly comprises an in-spindle motor assembly.

* * * * *